US008150715B1

(12) United States Patent
Yee et al.

(10) Patent No.: US 8,150,715 B1
(45) Date of Patent: *Apr. 3, 2012

(54) FLEXIBLE VARYING PREMIUM OPTION FOR COMBINATION PRODUCTS INCLUDING LONG TERM CARE INSURANCE

(75) Inventors: Robert Yee, San Francisco, CA (US); Hersh Markusfeld, Mill Valley, CA (US); Janet M. Soppe, Bedford, TX (US)

(73) Assignee: Strategic Health Management Corporation, Larkspur, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/346,602

(22) Filed: Dec. 30, 2008

Related U.S. Application Data

(63) Continuation-in-part of application No. 11/291,554, filed on Nov. 30, 2005.

(60) Provisional application No. 60/665,211, filed on Mar. 24, 2005.

(51) Int. Cl.
*G06Q 40/00* (2006.01)

(52) U.S. Cl. .................................. 705/4; 705/2

(58) Field of Classification Search .............. 705/2–4, 705/35, 36; 708/163
See application file for complete search history.

(56) References Cited

U.S. PATENT DOCUMENTS

| 5,523,942 | A | | 6/1996 | Tyler et al. |
| 5,752,236 | A | * | 5/1998 | Sexton et al. .................. 705/4 |
| 5,956,691 | A | | 9/1999 | Powers |
| 2002/0103678 | A1 | | 8/2002 | Burkhalter et al. |
| 2002/0173995 | A1 | | 11/2002 | Schiminovich |
| 2003/0023544 | A1 | | 1/2003 | Chodes |
| 2004/0039588 | A1 | * | 2/2004 | Libman ........................... 705/1 |
| 2004/0039608 | A1 | | 2/2004 | Mazur et al. |
| 2004/0148202 | A1 | * | 7/2004 | Siefe et al. ...................... 705/4 |
| 2005/0288971 | A1 | | 12/2005 | Cassandra |
| 2008/0114619 | A1 | * | 5/2008 | Krutter et al. .................. 705/4 |

OTHER PUBLICATIONS

U.S. Appl. No. 11/291,554, filed Nov. 30, 2005.
Official Action dated Oct. 1, 2009 for U.S. Appl. No. 11/291,554, filed Nov. 30, 2005.
Official Action dated May 27, 2010 for U.S. Appl. No. 11/291,554, filed Nov. 30, 2005.
Official Action dated Jan. 21, 2011 for U.S. Appl. No. 11/291,554, filed Nov. 30, 2005.
U.S. Appl. No. 11/389,416, filed Mar. 24, 2006.
Official Action dated Mar. 4, 2010 for U.S. Appl. No. 11/389,416, filed Mar. 24, 2006.
Official Action dated Aug. 18, 2010 for U.S. Appl. No. 11/389,416, filed Mar. 24, 2006. Prudential Brochure, Prior to Jun. 30, 2005, 2 pp.
Met Life Brochure, Prior to Jul. 1, 2005, 1 p.
Allianz Brochure, Prior to Jul. 1, 2005, 1 p.
Official Action received from USPTO dated Oct. 24, 2011 for U.S. Appl. No. 11/389,416, filed Mar. 24, 2006.

* cited by examiner

*Primary Examiner* — Gerald J. O'Connor
*Assistant Examiner* — Michelle Le
(74) *Attorney, Agent, or Firm* — Brill Law Office; Jeffrey Brill

(57) ABSTRACT

Flexible, varying long term care insurance programs for use as parts of combination long term care products are generated. Input variables such as issue age, targeted present value and year-to-year premium relationship are supplied, as are some members of a set of process variables. A non-supplied process variable is calculated based on the input variables and the supplied process variables. An insurance program based on the supplied variables and the calculated process variable is then generated, such that the premium schedule increases (or alternatively, increases and decreases) over time to at least one leveling point, at which premiums become level. A combination long term care product is produced by coupling the generated insurance program with a life insurance program or annuity.

14 Claims, 3 Drawing Sheets

FLEXIBLE VARYING PREMIUM OPTION FOR COMBINATION PRODUCTS INCLUDING LONG TERM CARE INSURANCE

PRIORITY CLAIM

This application is a continuation in part of commonly assigned, co-pending U.S. patent application Ser. No. 11/291,554, filed Nov. 30, 2005, entitled "Flexible Varying Premium Option for Long Term Care Insurance," the entirety of which is hereby incorporated by reference (the "FIPO for LTCI Application"). The FIPO for LTC Application claims the benefit under 35 U.S.C. §119(e) of U.S. Provisional Patent Application Ser. No. 60/665,211, filed Mar. 24, 2005, entitled "Long Term Care Insurance, A New Premium Paradigm: Increasing Premiums with Cap at Later Ages," the entirety of which is incorporated herein by reference.

TECHNICAL FIELD

This invention pertains generally to generating insurance programs, and more specifically to methodology for providing flexible increasing premium options for long term care insurance coverage within life insurance and annuity policies.

BACKGROUND

Long-Term Care (LTC) insurance policies cover services including nursing home stays, assisted living facility stays, home health care, adult day care and personal care services. Subject to benefit eligibility requirements, policies typically reimburse actual long-term care expenses up to a specified daily maximum for a total amount up to a specified lifetime maximum, with indemnity and disability benefit payment plans also available. LTC insurance policies have typically been sold as standalone health insurance coverage.

Although standalone LTC insurance policies are the norm in the market today, surveys show many people do not buy these policies, particularly while they are young, for two primary reasons: 1) young people tend not to realistically accept that they may need LTC services one day, and hence will not pay for insurance they believe they will never use, and, 2) people do not think that they can afford to pay for LTCI from their current income. As people age, they often become more realistic about the need for LTC, and desire alternative ways to finance this insurance protection.

Occasionally LTC benefits have been imbedded in, or as riders to, life insurance and annuity policies, but this has historically been fairly minimal, with unclear tax implications. Recently, the landscape has changed. In August 2006, the Pension Protection Act of 2006 (PPA) was enacted. It includes new tax incentives for the purchase of certain life insurance and annuity policies with LTC benefits—referred to herein as "Combination LTC Products." The PPA provides incentives for the purchase of Combination LTC Products, in an attempt to increase the private insurance coverage of long term care expenses, thereby relieving some of the strain on Medicare and Medicaid. Lack of LTC coverage for our aging population is an increasingly urgent problem; as LTC risks increase sharply with advancing age, and the cost of LTC insurance is often unaffordable unless funding begins at a relatively early age.

The PPA encourages purchase of private LTC insurance (LTCI) by those who will or have already invested in life insurance and/or annuities. The PPA provides favorable tax treatment for purchase or exchange of in-force annuity and life insurance policies for Combination LTC Products starting Jan. 1, 2010. This allows the utilization of the value of life insurance and/or annuities to provide LTCI protection. This not only provides incentives for individuals and groups to purchase such Combination LTC Products, but also for life and health insurers to develop new Combination LTC Products to meet the varying needs and financial resources of the rapidly growing and underserved LTCI market. The passage of the PPA, with its Combination LTC Product tax advantages effective Jan. 1, 2010, has created a certain urgency in the development of such products.

Combination LTC Products are characterized by LTC benefits embedded in life insurance or annuities. The charges for the LTC benefits are deducted periodically (typically monthly) from the account value of the policy. The typical pricing of these Combination LTC Products has been either a level charge for the elected LTC benefits based on issue age, or level basis points (a level percentage of the account value in the policy), also based on issue age. Since the likelihood of using long term care services increases substantially with advancing age, the charges for such coverage, if financed on a year to year basis, can become unaffordable at higher ages, just when the insured party might need the coverage. The "levelized" pricing structures mentioned above address that problem by providing significant financing of the later cost by the payments made in the earlier durations of the policy. However, these pricing structures have their own drawbacks, such as smaller growth in annuity (or life insurance) account value, especially in the early durations of the coverage, and less LTC coverage/benefits in the policy. It would be desirable to address these issues.

SUMMARY OF INVENTION

To address the concerns described above, the methodologies disclosed in the FIPO for LTCI Application can also be applied to Combination LTC Products. In such scenarios, the early duration LTCI charge is less, allowing for greater build-up in account value in the early stages of the policy. The ultimately greater charges over time allow for a much larger LTC benefit in the policy. With such Combination LTC Products, those who never need or use LTC still have the value of the life insurance policy or annuity, and the insurance cost of the LTC benefits can be funded by tax-deferred or tax-free earnings on account value, as opposed to current income.

Application of this type of methodology is not dependent on the type of Combination LTC Product. It is applicable for LTCI combined with life insurance, variable life insurance and fixed, indexed, and variable annuities. In addition, any LTC benefit structure can be accommodated by the increasing charge schedule. More specifically, methods, computer program products and computer systems can generate flexible, varying combination long term care insurance programs, which are coupled with life insurance and/or annuities in Combination LTC Products. Input variables such as issue age, targeted present value and the year-to-year charge relationship are supplied, as are some members of a set of process variables. A non-supplied process variable is calculated based on the input variables and the supplied process variables. In one embodiment, three of the following four process variables are supplied: a set of policy features and asset assumptions, an initial basis point charge (percentage), a leveling point and an ultimate level basis point charge. In that embodiment, the fourth process variable is then calculated based upon the other three and the input variables. An insurance program based on the supplied variables and the calculated process variable is then generated, such that the corresponding basis point charge schedule increases (or alternatively, increases and decreases) over time to at least one leveling point, at which charges become level. The generated program is intended to meet the present and future needs of the buyer, and yet still hit the target present value so that it is profitable to the insurer.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
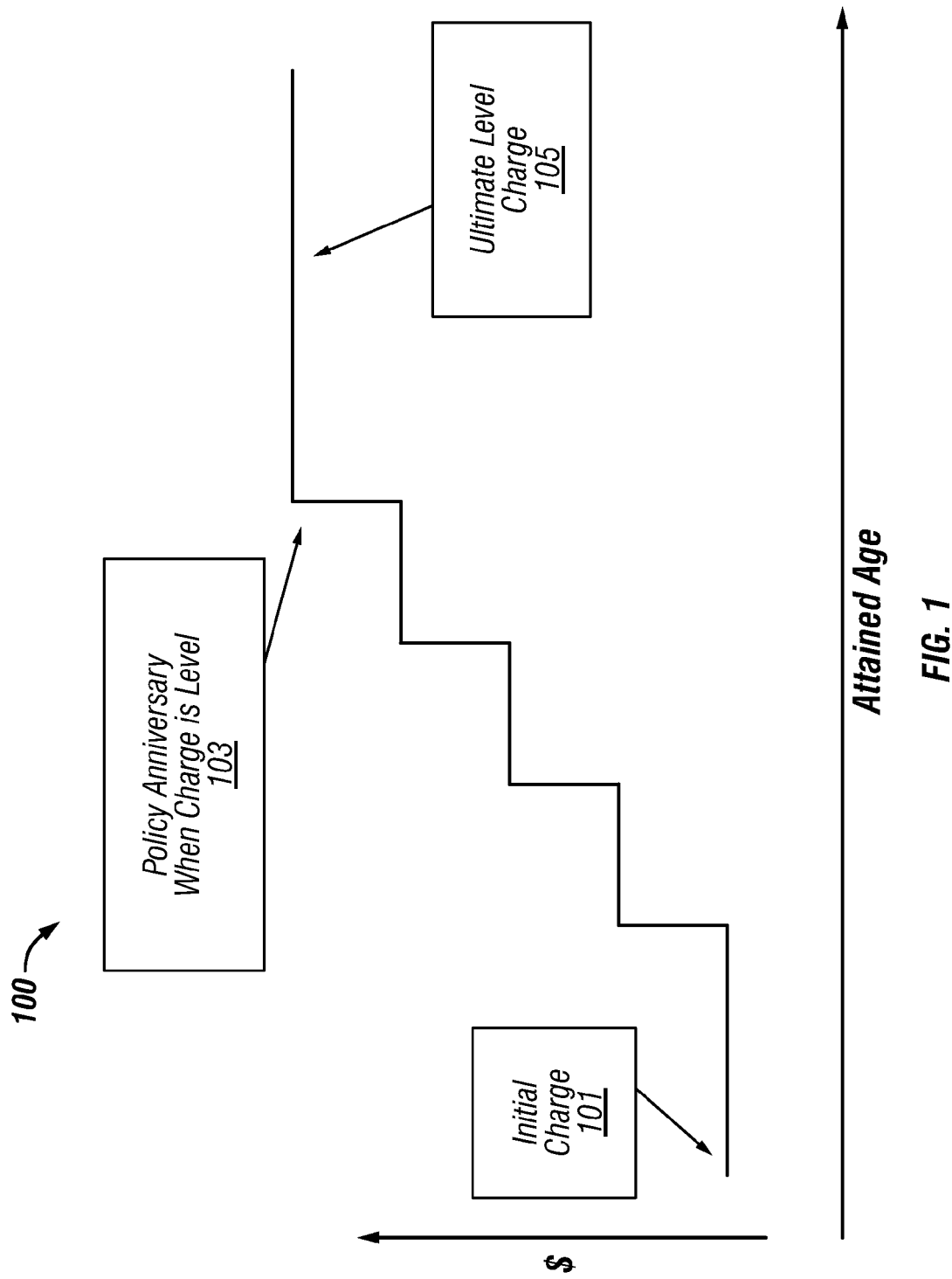
FIG. 1 is a block diagram illustrating generating an LTCI charge schedule with an increasing pattern for use in Combination LTC Products, according to some embodiments of the present invention.

FIG. 1 illustrates a high level overview of generating an LTCI charge schedule 100 with an increasing pattern for use in a Combination LTC Product, according to one embodiment of the present invention. In the embodiment illustrated in FIG. 1, the schedule begins with an initial charge 101 at the first policy year and uses calculated, incremental pre-funding to increase to a policy anniversary 103 (or other point) at, for example, a pre-determined attained age or policy duration, at which point the charge becomes level 105. The level charge 105 remains in effect from that policy anniversary 103 and thereafter. Through the use of incremental pre-funding early on, the schedule can be leveled at the desired 103 point even though the real cost of the policy benefits increase as the insured party ages.

Charges will generally become level at some duration or attained age 105 when the insured party attains an older age at which he prefers to levelize, decrease, or even terminate the charges. One example could be an assumed age at which a spouse may pre-decease the insured, resulting in a loss of social security and other retirement income for the surviving spouse. However, in other embodiments of the present invention, other ages as well as non-age based events can be used to reform the schedule 100 based on the needs of the insured or group. Any anticipated future event of the buyer can be met through the use of different charge schedules 100, impacting the timing and amount of pre-funding. For example, the rate of increase can be set to incrementally raise at the time of anticipated events which will raise the buyers level of disposable income (e.g., children graduate from college, home mortgage is paid off), or level off (or alternatively, increases and decreases) in accordance with income lowering events, such as children entering college, retirement, assumed age of spouse's death, etc. Specific charge schedules 100 can be generated by the insurers according to various embodiments of the present invention in order to address the needs of various segments of the market. The schedule 100 can range from a simple schedule 100 for the retiree market that, for example, increases every five years by attained age until age 80 to a more complicated schedule 100 that is customized to an individual applicant in the individual market.

Schedules 100 generated according to various embodiments of the present invention comprise alternatives to the current issue age level charge or level basis point pattern. Such schedules 100 do not affect the underlying policy benefits. Schedules generated according to various embodiments of the present invention can lower the charges for the initial policy years below the corresponding level charge or level basis points of a policy with identical benefits The ultimate charge will thus be higher than the corresponding level charge.

In some, but not all embodiments of the present invention, schedules 100 are generated for policies with a provision for inflation protection. Such policies are more expensive than policies without the inflation protection. Note also that in some embodiments, under a policy generated by an embodiment of the present invention, an insured with an inflation protection provision can choose to freeze charges at the current level and benefits at a corresponding level should an unforeseen event occur causing future charge increases to be unaffordable.

Figure 2:
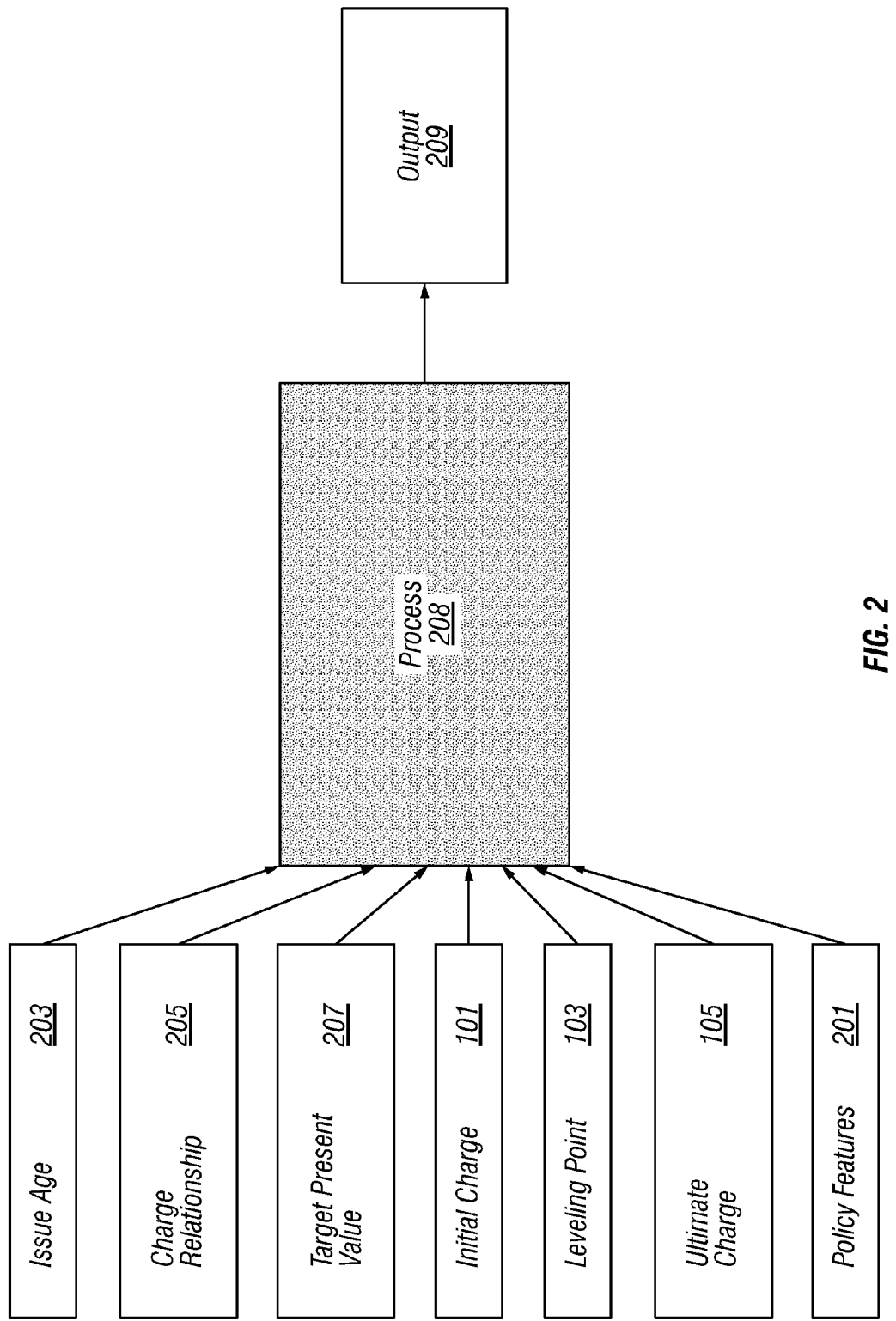
FIG. 2 is block diagram illustrating a process using a plurality of variables to generate a Combination LTC Product insurance program, according to some embodiments of the present invention.

FIG. 2 illustrates the use of a plurality of variables to generate an insurance program (i.e., a set of benefits and a corresponding charge schedule 100), according to some embodiments of the present invention. Note that the example of FIG. 2 illustrates variables used for generating a schedule 100 with charges that are raised until a single leveling point 103, as illustrated in FIG. 1. However, the variables can be adjusted to generate schedules 100 with multiple leveling points 103 and/or one or more increase or decrease points as desired.

The process of generating an insurance program 100 according to the present invention can utilize the following variables:
1. a set of policy features and asset assumptions 201;
2. the initial annual charge 101, e.g., payable during the first policy year;
3. the point 103 at which the charges become level (e.g., the policy anniversary at which time the charges become level);
4. the amount of the ultimate level charge 105;
5. the issue age 203;
6. the year-to-year charge relationship 205 during the period when basis points are increasing; and
7. a targeted present value 207 of future charges.

The last three variables 203, 205 and 207 are inputs to an insurance program generation process 208 that are specified prior to the program 200 generation. With any three of the first four variables 201, 101, 103, 105 selected, a value 209 for the remaining variable of the first four can be calculated. This output value 209 and the three selected variables define the insurance program 200 (e.g., in the illustrated example a program 200 with a charge schedule 100 that increases during a prescribed period and then becomes level). Where more complicated programs 200 and/or schedules 100 are desired, the variables are adjusted accordingly (e.g., multiple leveling dates, other types of adjustment dates, etc.).

Given the supplied inputs, the first four variables, namely, the policy features 201, the initial basis point charge 101, the leveling point 103 and the ultimate level basis point charge 105, generate an insurance program 200. By varying these four factors, an insurance program 200 can be generated that meets the requirement of a potential purchaser. For example, suppose that an initial charge 101 is desired for a specific plan 201, and a specific leveling age 103 is selected. The ultimate level charge 105 is then calculated based on the supplied variables. Alternatively, given an attained age 103 when basis point charges will become level, an ultimate level charge 105 and a specific plan 201, the initial basis point charge 101 can be solved.

Each of the variables is now described in greater detail. An LTC benefit in a Combination LTC Product is typically defined by the following features 201: periodic (e.g., daily, monthly or yearly) benefit maximum, lifetime benefit maximum, elimination period, inflation protection option, underwriting risk class, and other optional benefits. These features can either be inputs to the generation process 208 or the output 209. While embodiments of the invention can solve for any one or a combination of the features, it is most convenient to solve for the periodic benefit maximum, with other features specified beforehand. For cost and risk reasons, the insurer may impose upper and lower limits on the periodic benefit maximum.

The initial charge 101 can either be an input to the process 208 or the output 209. As an input, the initial charge 101 is typically expressed as a percentage of the corresponding level charge for a plan with the identical issue age and policy features. Insurers incur considerable costs to acquire a policy. These costs include marketing expenses, underwriting and issue expenses, commissions, risk-based capital, deferred acquisition cost tax, etc. Accordingly, insurers may want to set a minimum on the initial charge 101 in order to recoup the acquisition costs within a reasonable period.

The leveling point 103 (e.g., the policy anniversary when the charges become level) can either be an input to the process 208 or the output 209. It can be, for example, any anniversary after issue. In order to make the initial charge 101 relatively low, insurers may require a minimum number of increasing charge years before charges become level in the future.

The ultimate level annual charge 105 can either be an input to the process 208 or the output 209.

Issue age 203 affects the amount of charges since the likelihood of claiming for LTC services increases with age.

The charge relationship 205 describes how the charge of one year is related to that of the prior year. Basic patterns are: a constant percentage increase each year based on the initial charge, and increases at the beginning of regular or irregular intervals but level during the intervals. Any combination of the basic pattern or other increasing patterns is possible. Combinations with today's existing charge patterns, such as future decreases or limited paying periods, are also possible. In order to minimize the potential impact of paying higher charges, an insurer may restrict the amount of the increases.

According to its profit goals, the insurer sets the targeted present value 207 of charges. The present value 207 of any increasing charge schedule 100 is then calibrated to meet this target 207. The target present value 207 varies by issue age and policy features as described under the first variable.

The targeted present value 207 takes into account the expected time value of money and the expected persistency of policies. A discount rate determines the expected time value of money. The discount rate does not necessarily tie to the expected investment return of the assets in the insurer's investment portfolio allocated to its LTC insurance business or the return on the account value in the policy to which the LTC benefit is being added. A table of expected mortality rates that vary by attained age and a set of expected policy lapse rates typically form the basis for the persistency assumption.

To determine the targeted present value 207, the insurer starts with the corresponding level charge or level basis point charge for the specific set of policy features 201. It calculates the projected profits based on morbidity, persistency, investment return and expense assumptions. This level charge is adjusted until the desired projected profits are achieved. Then, the present value of the level charges, calculated using the discount rate, mortality and voluntary lapse rates, is set as the target 207.

Once an insurer gains sufficient experience from sales of insurance programs 200 generated according to the present invention, refinements can be applied to help achieve the profit objectives more precisely. For example, instead of using a level charge, the insurer may use an increasing charge schedule 100 that represents the expected average of all the schedules 100 to be generated according to the present invention for a specific issue age 203 and policy features 201.

In setting the targeted present value 207, the insurer seeks to strike a balance between desired profit goals and attractiveness of the resulting charge schedules 100 to the potential purchasers. A low target 207 will undermine the profit objectives while a high target 207 will produce an expensive charge schedule 100, which may not compare favorably with the corresponding level charge.

Due consideration is also given to the contingency that the insured can opt to request a freeze in future charges at the current level with a corresponding freeze, or a corresponding benefit offset of the benefits. The purpose of this option is to mitigate potential lapse by the insured when and if future charge increases become a financial burden or life circumstances change.

The process 208 employs an iterative procedure to compare the targeted present value 207 with the present value of future charges from the interim premium schedule 100. Once the discounted value of a schedule 100 matches the target 207, that schedule 100 becomes the solution.

For purposes of illustration, some examples of generating insurance programs 200 according to various embodiments of the present invention follow.

Example 1

A 50 year old man (issue age 203) purchases a universal life Combination LTC Product with an initial face amount of $200,000. If he qualifies for Long-Term Care benefits during the first policy year, he receives a monthly benefit of $8,300 for a maximum of 48 months (policy features 201). The monthly benefit in later policy years increases by 5% per year. The death benefit is reduced by the monthly benefit paid, but in no case becomes less than $20,000. The initial premium for the policy is $60,000. The increasing monthly charge schedule 100 for the Long-Term Care benefit starts with a $60 monthly charge in the first year, increasing 8.5% per year (premium relationship 205) and reaching a monthly ultimate level charge 105 of $204 at attained age 65 (leveling point 103). A purchaser at a different issue age 203 would have a different charge schedule 100.

Example 2

A 56 year old woman (issue age 203) purchases an annuity Combination LTC Product with a deposit of $100,000. The account value of the annuity contract is credited with an interest rate declared by the company annually. If she qualifies for Long-Term Care benefits, she receives a monthly benefit equal to 2.5% of the account value for a maximum of 72 months (policy feature 201). The monthly benefits are first to be deducted from the account value. The increasing annual charge schedule 100 for the Long-Term Care benefit as a percentage of the account value starts with an initial basis point charge 101 and ends with a level ultimate basis point charge 105 at attained age 75 (leveling point 103). An example schedule (which would vary by issue age and gender) is shown in Table 1:

TABLE 1

| Attained Age | Increase |
|---|---|
| 56 to 59: | 30 bp |
| 60 to 64: | 45 bp |
| 66 to 69: | 65 bp |
| 70 to 74: | 85 bp |
| 75 & Over: | 105 bp |

Example 3

A 58 year old woman (issue age 203) purchases a variable annuity Combination LTC Product with a deposit of $130,000. The account value of the annuity contract is based on a balanced investment portfolio selected by the purchaser. After 10 years, the Combination LTC Product guarantees that she can withdraw a monthly amount equal to 0.5% of the account value for the rest of her life. If she qualifies for Long-Term Care benefits, she receives an additional 1% of the account value for a maximum of 48 months (policy feature 201). The increasing annual basis point charge schedule 100 for the Long-Term Care benefit applied to the account value starts with an initial basis point charge 101 and ends with a level ultimate basis point charge 105 at attained age 80 (leveling point 103). The example schedule shown in Table 2 applies to all contract-holders at their respective attained ages:

TABLE 2

| Attained Age | Increase |
|---|---|
| 58 to 59: | 47 bp |
| 60 to 64: | 70 bp |
| 66 to 69: | 101 bp |
| 70 to 74: | 132 bp |
| 75 to 79: | 155 bp |
| 80 & Over: | 171 bp |

Under level premium or level basis point premium based LTCI policies, premiums in the early policy years (except for the first year) exceed the expected claims plus expenses. Portions of the excess of premiums over claims and expenses are set aside as reserves in order to pay claims in the later years when claims exceed premiums and expenses. Such pre-funding will be less for policies generated according to the present invention than corresponding level premium or level basis point premium policies.

Figure 3:
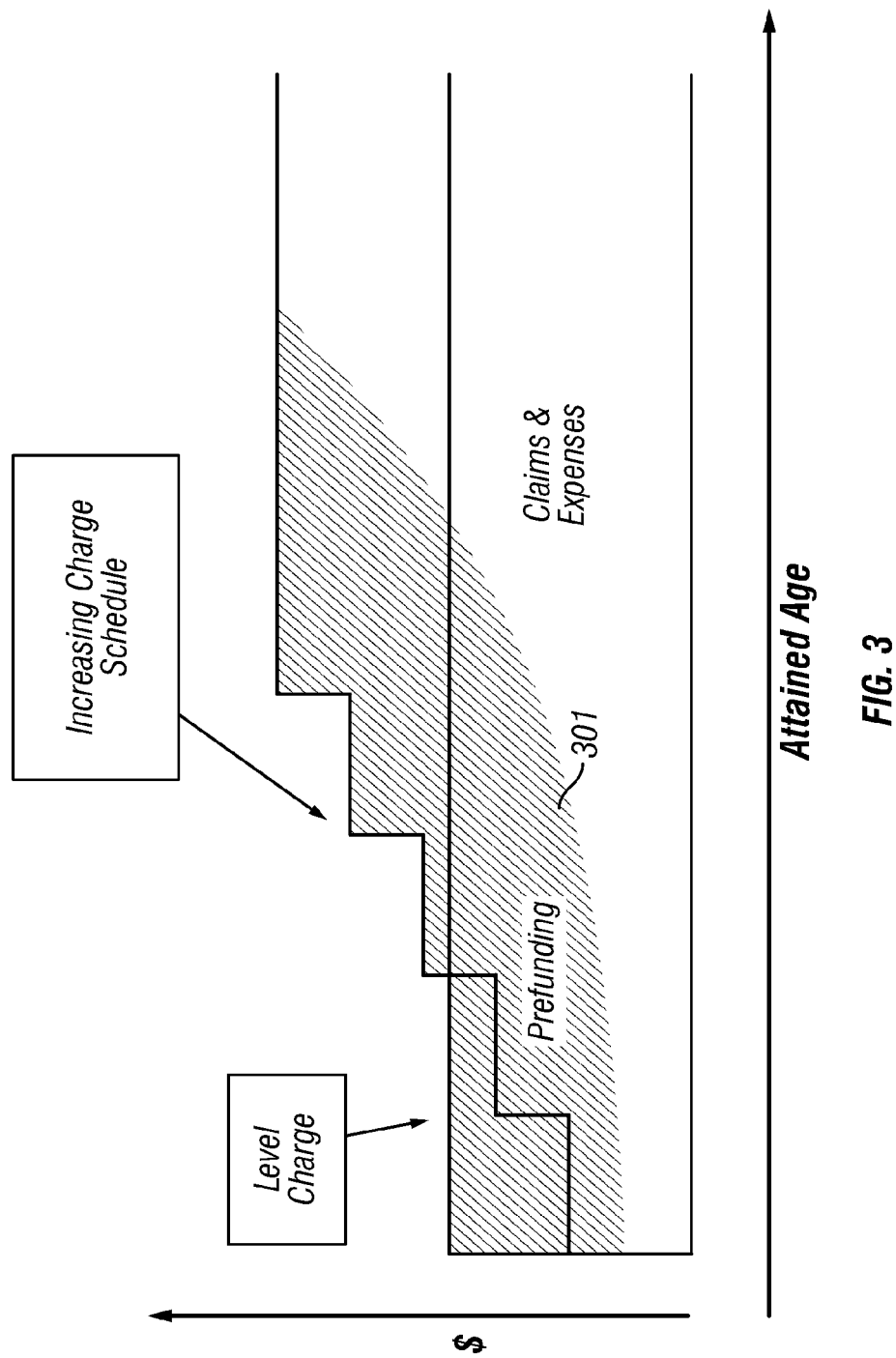
FIG. 3 is a diagram illustrating the relative degree of pre-funding for a Combination LTC Product schedule generated according to an embodiment of the present invention.

FIG. 3 illustrates the degree of pre-funding 301 during the first 30 years of an LTCI policy issued as part of a Combination LTC Product generated according to an embodiment of the present invention, for purchase by an insured party at age 50. Relative to level premium or level basis point policies, the lower pre-funding 301 provides lower costs of coverage for insureds who lapse or make a claim in the early policy years (premiums are typically waived during claim periods). Furthermore, lower pre-funding 301 implies lower long term care insurance reserves in the early policy years.

In developing a Combination LTC Product, an insurer desires a reasonable return on its capital investments. For establishing premiums, return is measured recognizing the time value of money. Consequently, profit margins in the early policy years have a greater impact on the return than those in the later years. Thus, because of the lower premiums in the early years when compared to a level premium or level basis point policy with the same benefits, the return from policies generated according to the present invention would be correspondingly lower, all other things being equal.

In setting the target present value 207, the insurer has two mitigating factors that help to offset the effect of lower initial premiums on margins. First, in most cases, commissions, as a percentage of premiums, are higher in the first policy year than renewal years. On a discounted basis, commissions from the increasing basis point premium schedule 100 generated according to the present invention will be relatively lower as a percentage of all premiums than the corresponding commissions from a level premium or level basis point structure. Second, the reserves will also be lower, as described above. Since reserves are part of invested assets, lower reserves will also result in lower investment returns. However, the net effect, in general, would be to provide greater margins in the early policy years for policies generated according to the present invention than for level premium or level basis point policies. Thus embodiments of the present invention enable the lowering of the initial cost of coverage for the insured while maintaining profitability for the insurer.

According to various embodiments of the present invention, LTCI policy premiums can be more affordable both now and later. Individuals who cannot afford the level premiums of current policies with appropriate coverage can purchase Combination LTC Products generated according to the present invention. For those who can afford the level premiums but may have to select inadequate coverage to do so, the invention enables them to purchase adequate coverage from the start. Paying the LTCI increasing basis point premiums from assets, not income, can help potential buyers afford the cost of private long term care insurance. In addition, the tax advantages provided by the Pension Protection Act of 2006 create financial efficiencies not available with stand-alone LTCI products. According to various embodiments of the present invention, a premium schedule 100 can be generated that requires fewer premium dollars in the early years than a policy with level premiums. Should the policy lapse in the early years, the policyholder would have paid less in premiums than with a level premium policy for the same coverage. Under various embodiments of the present invention, a policyholder can purchase better benefits initially with the potential to later decide to levelize their basis points prior to future basis point increases should circumstances change. This flexibility works to the advantage of the policyholder.

As will be understood by those familiar with the art, the invention may be embodied in other specific forms without departing from the spirit or essential characteristics thereof. Likewise, the particular naming and division of the processes, variables, modules, agents, managers, functions, layers, features, attributes, methodologies and other aspects are not mandatory or significant, and the mechanisms that implement the invention or its features may have different names, divisions and/or formats.

Furthermore, the portions, modules, agents, managers, components, functions, procedures, actions, layers, features, attributes, methodologies and other aspects of the invention can be implemented as software for running on a programmable computer, hardware, firmware or any combination of the three. Where the present invention is implemented in whole or in part in software, the software components thereof can be stored on computer readable media as computer program products. Any physical form of computer readable medium can be used in this context, such as magnetic or optical storage media. As used herein, the term "computer readable medium" does not mean an electrical signal separate from an underlying physical medium. Additionally, software portions of the present invention can be instantiated (for example as object code or executable images) within the memory of a computing device. Accordingly, the disclosure of the present invention is intended to be illustrative, but not limiting, of the scope of the invention, which is set forth in the following claims.

What is claimed is:

1. A computer implemented method for calculating a flexible, varying long term care insurance program as a part of a combination long term care product, the method comprising the steps of:
   receiving, by a computer, a plurality of input variables, comprising at least an issue age, a targeted present value and a year-to-year premium relationship;
   receiving, by the computer, a plurality of process variables;
   calculating, by the computer, a non-received process variable, based on received variables;
   calculating, by the computer, a set of benefits and a corresponding charge schedule based on the received variables and the calculated process variable such that the calculated charge schedule varies over time but comprises at least one period during which premiums raise to a leveling point according to the year-to-year premium relationship, the calculated set of benefits and the calculated charge schedule being informed by prefunding during the at least one period during which premiums raise to a leveling point; and
   producing, by the computer, a combination long term care product by coupling the calculated set of benefits and the calculated charge schedule with a life insurance program or an annuity.

2. The method of claim 1 further comprising:
   calculating, by the computer, a charge schedule comprising multiple leveling points.

3. The method of claim 1 further comprising:
   calculating, by the computer, a charge schedule with at least one period during which premiums decrease to a leveling point.

4. The method of claim 1 further comprising:
   calculating, by the computer, a charge schedule wherein premiums incrementally raise to a single leveling point, at which the premiums become level for the remainder of the calculated charge schedule, the calculated set of benefits and the calculated charge schedule being informed by prefunding during the period during which premiums incrementally raise to the leveling point.

5. The method of claim 4 further comprising:
   receiving, by the computer, three process variables from a group consisting of:
      a set of policy features;
      an initial premium amount;
      a leveling point; and
      an ultimate level premium;
   and calculating, by the computer, the fourth process variable of the group based on received input variables and the three received process variables.

6. The method of claim 5 wherein:
   the set of policy features specifies a provision for inflation protection.

7. The method of claim 5 further comprising:
   calculating, by the computer, the set of benefits and the charge schedule such that benefits and premiums can be frozen at any point in the calculated charge schedule.

8. At least one non-transitory computer readable medium storing a computer program product for calculating a flexible, varying long term care insurance program as a part of a combination long term care product, the computer program product comprising:
   program code for receiving, by a computer, a plurality of input variables, comprising at least an issue age, a targeted present value and a year-to-year premium relationship;
   program code for receiving, by the computer, a plurality of process variables;
   program code for calculating, by the computer, a non-received process variable, based on received variables;
   program code for calculating, by the computer, a set of benefits and a corresponding charge schedule based on the received variables and the calculated process variable such that the calculated charge schedule varies over time but comprises at least one period during which premiums raise to a leveling point according to the year-to-year premium relationship, the calculated set of benefits and the calculated charge schedule being informed by prefunding during the at least one period during which premiums raise to a leveling point; and
   program code for producing a combination long term care product by coupling the calculated set of benefits and the calculated charge schedule with a life insurance program or an annuity.

9. The computer program product of claim 8 further comprising:
   program code for calculating a charge schedule comprising multiple leveling points.

10. The computer program product of claim 8 further comprising:
    program code for calculating a charge schedule with at least one period during which premiums decrease to a leveling point.

11. The computer program product of claim 8 further comprising:
    program code for calculating a charge schedule wherein premiums incrementally raise to a single leveling point, at which the premiums become level for the remainder of the calculated charge schedule, the calculated set of benefits and the calculated charge schedule being informed by prefunding during the period during which premiums incrementally raise to the leveling point.

12. The computer program product of claim 11 further comprising:
    program code for receiving three process variables from a group consisting of:
       a set of policy features;
       an initial premium amount;
       a leveling point; and
       an ultimate level premium;
    and program code for calculating the fourth process variable of the group based on received input variables and the three received process variables.

13. The computer program product of claim 12 wherein:
    the set of policy features specifies a provision for inflation protection.

14. The computer program product of claim 12 further comprising:
    program code for calculating the insurance program such that benefits and premiums can be frozen at any point in the program.

* * * * *